United States Patent
Croak et al.

(10) Patent No.: US 8,457,108 B1
(45) Date of Patent: Jun. 4, 2013

(54) METHOD AND APPARATUS FOR MONITORING CLIENT SOFTWARE USAGE IN END USER DEVICE

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1184 days.

(21) Appl. No.: 11/022,623

(22) Filed: Dec. 27, 2004

(51) Int. Cl.
*H04L 12/66* (2006.01)
*H04L 12/28* (2006.01)
*G06F 15/16* (2006.01)

(52) U.S. Cl.
USPC ...... 370/352; 370/364; 370/395.52; 709/203; 709/217

(58) Field of Classification Search
USPC .................. 370/200–503; 709/200–253, 310
See application file for complete search history.

(56) References Cited

U.S. PATENT DOCUMENTS

| | | | | |
|---|---|---|---|---|
| 6,167,358 A * | 12/2000 | Othmer et al. | ................ | 702/188 |
| 6,332,198 B1 * | 12/2001 | Simons et al. | .................... | 714/6 |
| 6,363,488 B1 * | 3/2002 | Ginter et al. | ....................... | 726/1 |
| 6,427,140 B1 * | 7/2002 | Ginter et al. | ...................... | 705/80 |
| 6,434,532 B2 * | 8/2002 | Goldband et al. | ........... | 705/7.25 |
| 6,445,682 B1 * | 9/2002 | Weitz | ............................. | 370/257 |
| 6,473,794 B1 * | 10/2002 | Guheen et al. | ................ | 709/223 |
| 6,615,166 B1 * | 9/2003 | Guheen et al. | .................. | 703/27 |
| 6,640,304 B2 * | 10/2003 | Ginter et al. | .................. | 713/193 |
| 6,760,339 B1 * | 7/2004 | Noel et al. | ..................... | 370/401 |
| 6,801,940 B1 * | 10/2004 | Moran et al. | ................... | 709/224 |
| 6,868,092 B1 * | 3/2005 | Bell et al. | ........................ | 370/503 |
| 6,876,652 B1 * | 4/2005 | Bell et al. | ....................... | 370/386 |
| 6,904,449 B1 * | 6/2005 | Quinones | ........................ | 709/203 |
| 6,948,070 B1 * | 9/2005 | Ginter et al. | ................... | 713/193 |
| 6,950,847 B2 * | 9/2005 | Harrisville-Wolff et al. . | | 709/201 |
| 6,999,912 B2 * | 2/2006 | Loisey et al. | .................... | 703/21 |
| 7,023,845 B1 * | 4/2006 | Simons et al. | ................ | 370/389 |
| 7,039,046 B1 * | 5/2006 | Simons et al. | ................ | 370/388 |
| 7,054,272 B1 * | 5/2006 | Noel et al. | ...................... | 370/241 |
| 7,080,371 B1 * | 7/2006 | Arnaiz et al. | .................. | 717/170 |
| 7,133,845 B1 * | 11/2006 | Ginter et al. | ..................... | 705/51 |
| 7,155,502 B1 * | 12/2006 | Galloway et al. | ............. | 709/223 |
| 7,185,094 B2 * | 2/2007 | Marquette et al. | ........... | 709/225 |
| 7,237,238 B2 * | 6/2007 | Peppers et al. | ................ | 717/170 |
| 7,269,160 B1 * | 9/2007 | Friedman et al. | ............. | 370/352 |
| 7,280,529 B1 * | 10/2007 | Black et al. | ..................... | 370/352 |
| 7,283,519 B2 * | 10/2007 | Girard | ........................... | 370/353 |
| 7,313,592 B1 * | 12/2007 | Huboi et al. | ................... | 709/203 |
| 7,315,826 B1 * | 1/2008 | Guheen et al. | ............... | 705/7.29 |
| 7,319,992 B2 * | 1/2008 | Gaos | ............................... | 706/62 |
| 7,401,057 B2 * | 7/2008 | Eder | ................................ | 706/20 |
| 7,478,381 B2 * | 1/2009 | Roberts et al. | ................ | 717/168 |
| 7,496,661 B1 * | 2/2009 | Morford et al. | ............... | 709/224 |
| 7,546,359 B2 * | 6/2009 | Tierney et al. | ................ | 709/223 |
| 7,574,706 B2 * | 8/2009 | Meulemans et al. | .......... | 717/174 |
| 7,594,219 B2 * | 9/2009 | Ramachandran et al. | .... | 717/124 |

(Continued)

*Primary Examiner* — Ayaz Sheikh
*Assistant Examiner* — Venkatesh Haliyur

(57) ABSTRACT

The present invention enables a capability for packet-switched network service providers, e.g., VoIP network service providers, to monitor the CPE application usage of their subscriber to ensure that changes to the network do not interfere with these applications and to potentially provide changes to the network to enhance these premise based applications. Monitoring software will be installed in the CPE to monitor upgrades and features installed by the end users so that any potential impact to these applied applications can be assessed before a VoIP network upgrade is carried out.

18 Claims, 4 Drawing Sheets

U.S. PATENT DOCUMENTS

| | | | |
|---|---|---|---|
| 7,624,393 B2* | 11/2009 | Egan et al. | 717/173 |
| 7,685,254 B2* | 3/2010 | Pandya | 709/217 |
| 7,760,861 B1* | 7/2010 | Croak et al. | 379/114.14 |
| 8,056,802 B2* | 11/2011 | Gressel et al. | 235/382 |
| 8,261,979 B2* | 9/2012 | Gressel et al. | 235/382.5 |
| 2002/0001307 A1* | 1/2002 | Nguyen et al. | 370/386 |
| 2002/0012347 A1* | 1/2002 | Fitzpatrick | 370/392 |
| 2002/0038339 A1* | 3/2002 | Xu | 709/203 |
| 2002/0071529 A1* | 6/2002 | Nelkenbaum | 379/88.13 |
| 2002/0143874 A1* | 10/2002 | Marquette et al. | 709/204 |
| 2002/0165961 A1* | 11/2002 | Everdell et al. | 709/225 |
| 2003/0037171 A1* | 2/2003 | Madineni et al. | 709/310 |
| 2005/0229171 A1* | 10/2005 | Henry et al. | 717/168 |
| 2006/0010203 A1* | 1/2006 | Mrsic-Flogel et al. | 709/205 |
| 2006/0136570 A1* | 6/2006 | Pandya | 709/217 |
| 2006/0136914 A1* | 6/2006 | Marascio et al. | 718/100 |
| 2007/0169073 A1* | 7/2007 | O'Neill et al. | 717/168 |
| 2008/0191009 A1* | 8/2008 | Gressel et al. | 235/382 |
| 2010/0174770 A1* | 7/2010 | Pandya | 709/200 |

* cited by examiner

METHOD AND APPARATUS FOR MONITORING CLIENT SOFTWARE USAGE IN END USER DEVICE

The present invention relates generally to communication networks and, more particularly, to a method and apparatus monitoring client software in end user device in packet switched networks, e.g., Voice over Internet Protocol (VoIP) networks.

BACKGROUND OF THE INVENTION

Residential and enterprise customers of network services use various premise equipment for accessing a service provider's network. In addition to basic telephony applications, users of these network services rely on their Customer Premise Equipment (CPE) components for various other applications that may or may not interact with the service provider's network. For example, residential users sometimes use terminal adaptors to access home security systems and business customers access private databases via IP based Private Branch Exchange (PBX) to support telemarketing applications. Sometimes, a custom application or feature that is applied by an end user to the end user device may be adversely affected by an upgrade in the service provider's network.

Therefore, a need exists for a method and apparatus for monitoring client software usage in end user device in packet-switched networks, e.g., Voice over Internet Protocol (VoIP) networks.

SUMMARY OF THE INVENTION

In one embodiment, the present invention enables a capability for packet-switched network service providers, e.g., VoIP network service providers, to monitor the CPE application usage of their subscriber to ensure that changes to the network do not interfere with these applications and to potentially provide changes to the network to enhance these premise based applications. Monitoring software will be installed in CPEs to monitor upgrades and features installed by the end users so that any potential impact to these applied applications can be assessed before a VoIP network upgrade is carried out.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
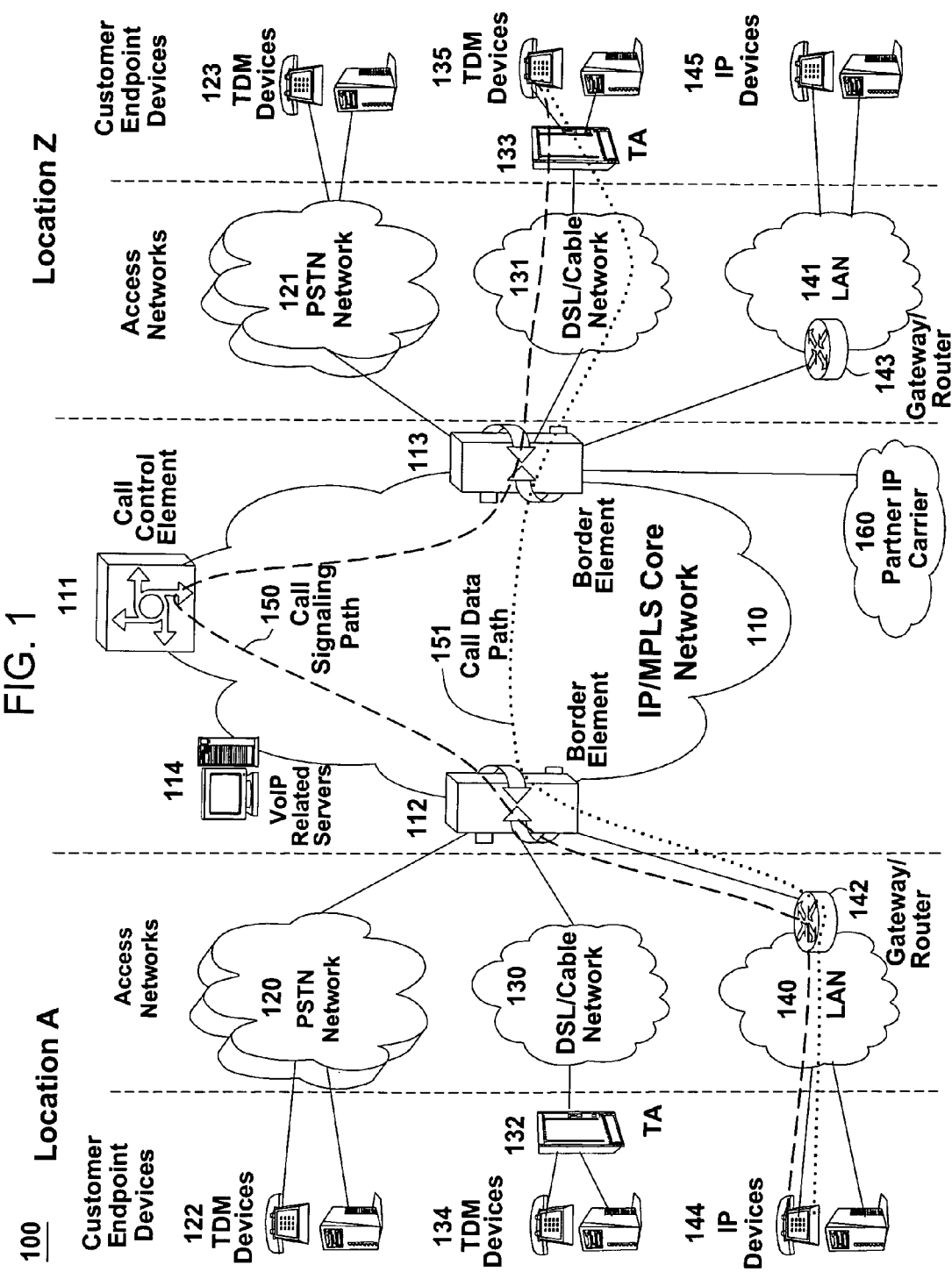
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Residential and enterprise customers of network services use various premise equipment for accessing the service provider's network. In addition to basic telephony applications, users of these network services rely on their Customer Premise Equipment (CPE) components for various other applications that may or may not interact with the service provider's network. For example, residential users sometimes use terminal adaptors to access home security systems and business customers access private databases via IP based Private Branch Exchange (PBX) to support telemarketing applications. Sometimes, a custom application or feature that is applied by an end user to the end user device may be adversely affected by an upgrade in the service provider's network.

To address this need, the present invention enables a capability for packet-switched network service providers, e.g., VoIP network service providers, to monitor the CPE application usage of their subscriber to ensure that changes to the network do not interfere with these applications and to potentially provide changes to the network to enhance these premise based applications. Monitoring software will be installed in CPEs to monitor upgrades and features installed by the end users so that any potential impact to these applied applications can be assessed before a VoIP network upgrade is carried out.

Figure 2:
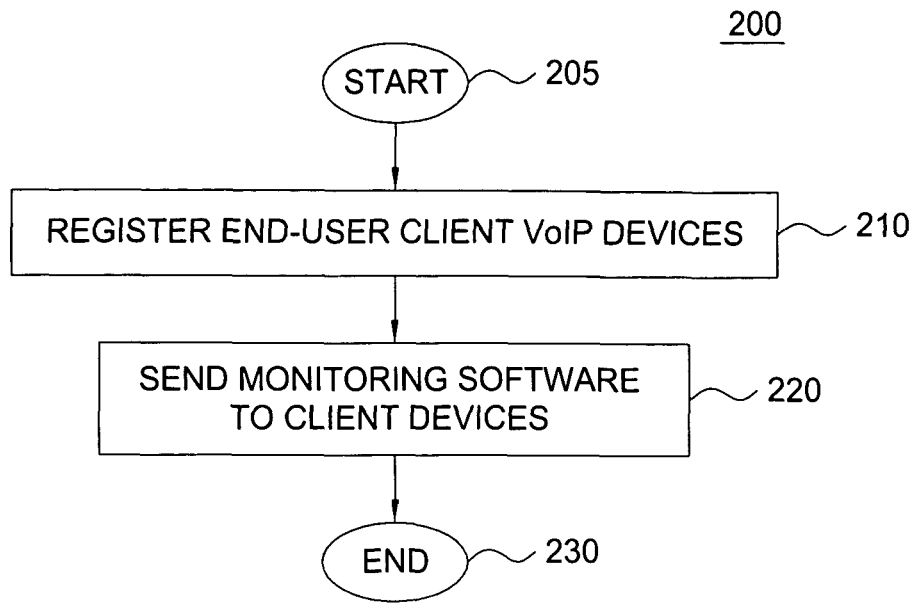
FIG. 2 illustrates a flowchart of a method for registering end user client device by a VoIP network of the present invention.

FIG. 2 illustrates a flowchart of a method for registering end user client device by a packet-switched network, e.g., a VoIP network. Method 200 starts in step 205 and proceeds to step 210.

In step 210, the method registers the type, the model, the version of hardware, the version of firmware and the type and/or version of at least one client software application of the client end point device (or CPE) that is used to access the VoIP network. Receiving the information pertaining to the end user client device will allow the service provider's network to determine what type of monitoring software that the end user client device will need to install.

In step 220, the method sends the CPE monitoring software to the end user client device. Once installed, the service provider's network will be able to monitor the application usage of the CPE. The method ends in step 230.

Figure 3:
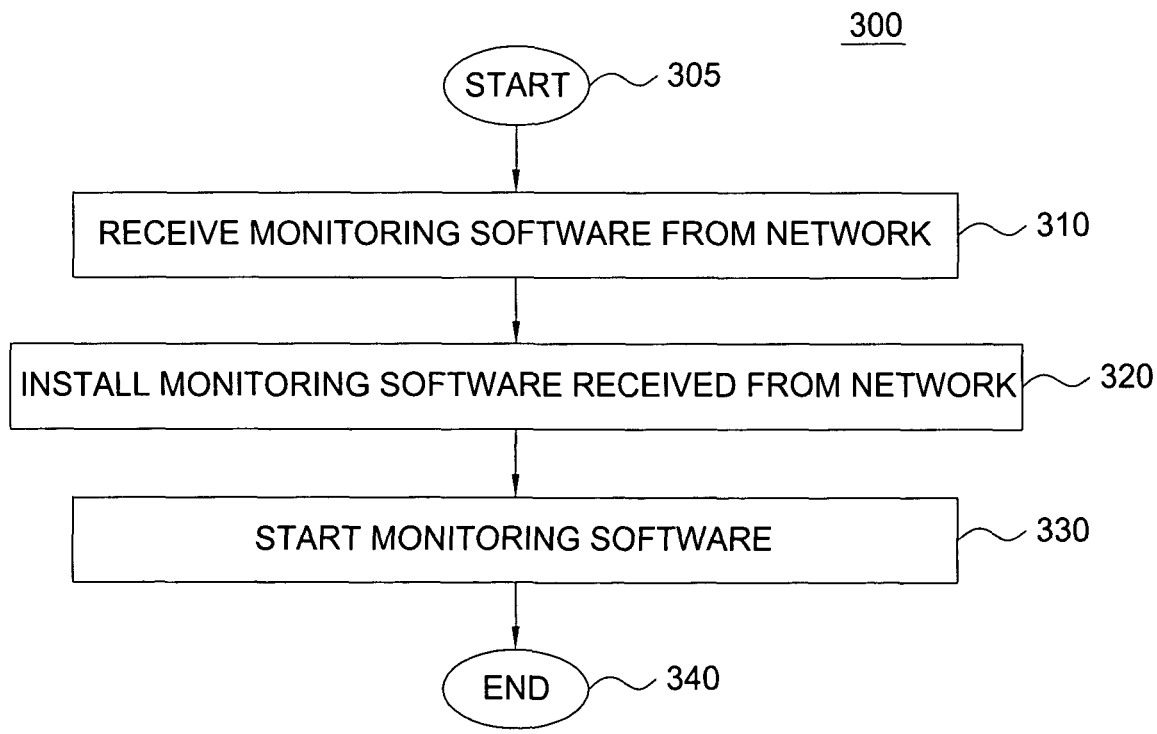
FIG. 3 illustrates a flowchart of a method for installing monitoring software in end user client device by a VoIP network of the present invention.

FIG. 3 illustrates a flowchart of a method for installing monitoring software in end user client device by a packet-switched network, e.g., a VoIP network. Method 300 starts in step 305 and proceeds to step 310.

In step 310, the method receives the CPE usage monitoring software from the network. In step 320, the method installs the CPE usage monitoring software on the end user client device. In step 330, the method starts the CPE usage monitoring software. The method ends in step 340.

Figure 4:
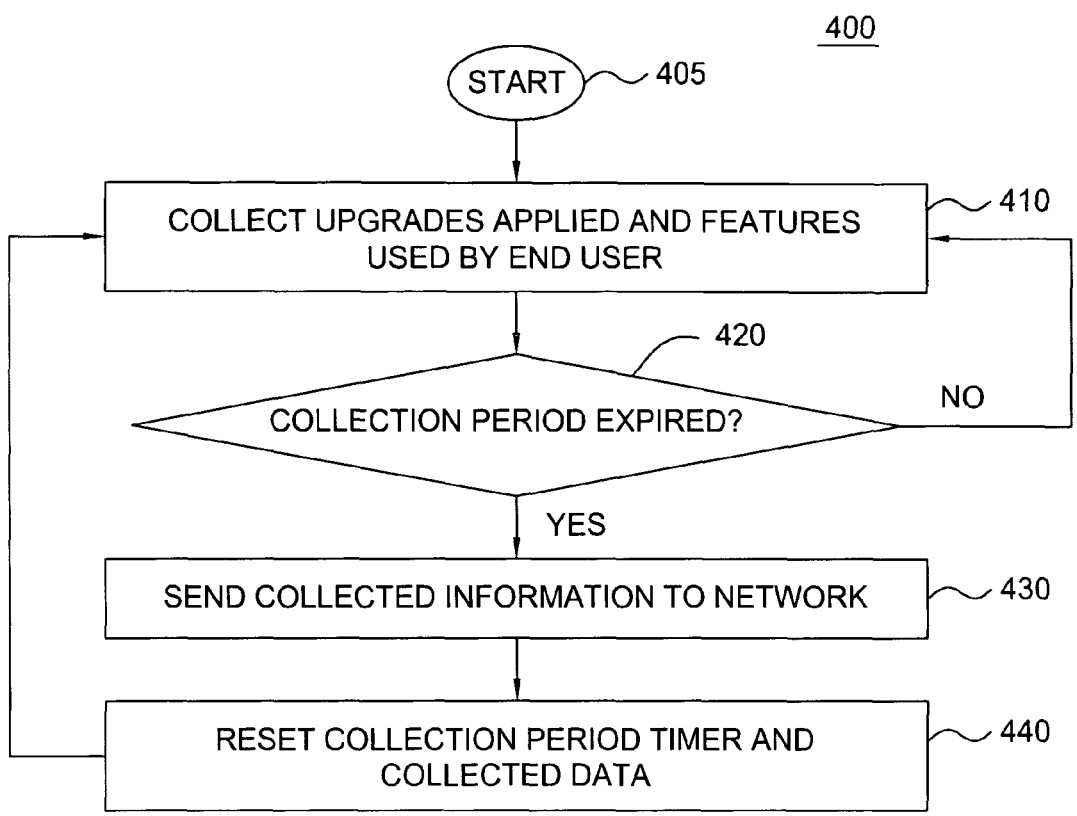
FIG. 4 illustrates a flowchart of a method for monitoring client software usage in end user device in a VoIP network of the present invention.

FIG. 4 illustrates a flowchart of a method for monitoring client software usage in end user device in a packet-switched network, e.g., a VoIP network. Method 400 starts in step 405 and proceeds to step 410.

In step 410, the method collects end user client application upgrades applied or features used by the end user. The usage monitoring software monitors the frequency that a particular feature supported by the IP based CPE device is used by an end user. The usage monitoring software also monitors the type of upgrades and their associated versions that are applied to the CPE device by an end user. In step 420, the method checks if the collection period has expired. If the collection period has expired, the method proceeds to step 430; otherwise, the method returns to step 410 and continues to collect end user application usage data. In step 430, the method sends the collected data to the network. In step 440, the method resets the collection period timer and empties the stored collected data and proceeds back to step 410.

By collecting end user client application upgrades applied and/or features used by the end user, the network will accumulate knowledge of the application usage of the CPE. This information will greatly enhance the service provider's ability to anticipate any future incompatibility with the CPE if the service provider needs to install upgrades and/or new service deployment in the service provider's network. This knowledge will allow a service provider to warn a customer that future upgrades may have negative impact to its CPE and the necessary steps to correct the potential incompatibility, e.g., upgrading to a newer version of a software application and so on.

Figure 5:
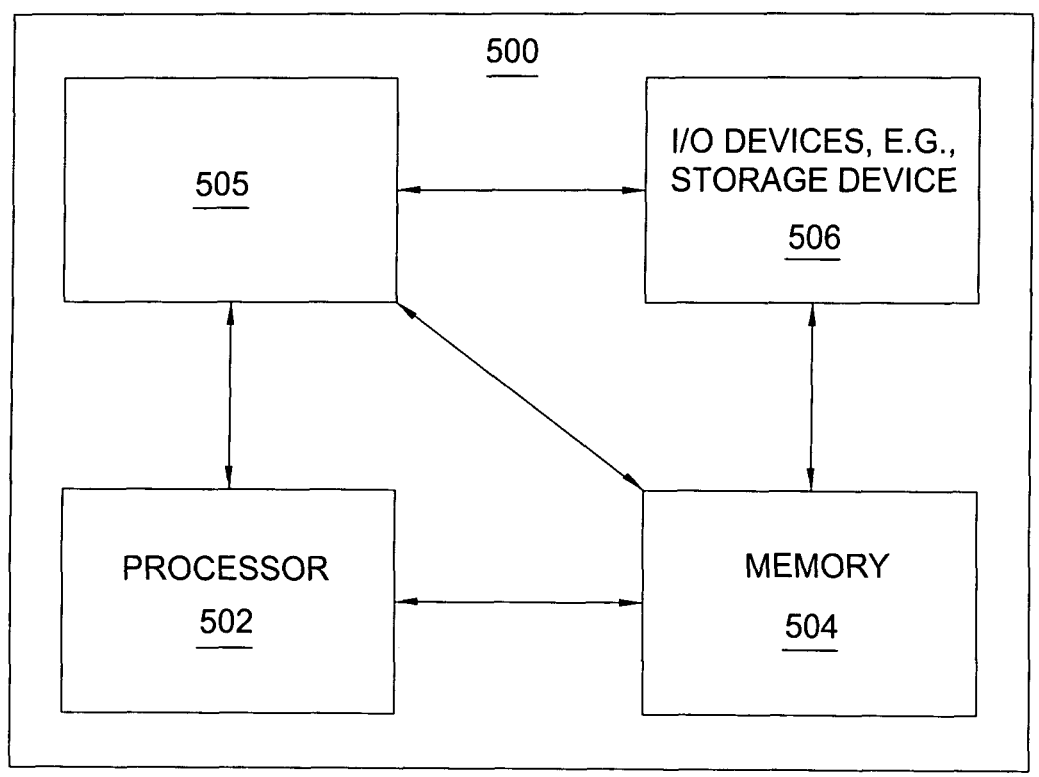
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a monitoring client software in end user device module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present monitoring client software in end user device module or process 505 can be loaded into memory 504 and executed by processor 502 to implement the functions as discussed above. As such, the present monitoring client software in end user device process 505 (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a client software application in an end user device in a communication network, comprising:
    registering, by a processor, the end user device with the communication network, wherein the registering comprises:
        registering a version of firmware deployed on the end user device; and
        installing a usage monitoring software on the end user device;
    monitoring, by the processor, an application in the end user device that does not interact with the communication network via the usage monitoring software that is installed;
    monitoring, by the processor, the client software application that is deployed in the end user device for accessing the communication network, wherein the monitoring the client software application comprises:
        monitoring data relating to a feature usage performed on the end user device, wherein the monitoring the data comprises monitoring a type and a frequency of a feature used on the end user device; and
    analyzing, by the processor, the data to detect a potential software incompatibility between the client software application and the application that does not interact with the communication network running on the end user device with a future network software upgrade to be performed by the communication network.

2. The method of claim 1, wherein the communication network is a voice over internet protocol network.

3. The method of claim 1, wherein the registering further comprises:
    registering a type of the end user device.

4. The method of claim 1, wherein the data is received periodically.

5. The method of claim 1, wherein the end user device is an internet protocol based customer premise equipment device.

6. A non-transitory computer-readable medium to store a plurality of instructions which, when executed by a processor, cause the processor to perform operations for monitoring a client software application in an end user device in a communication network, the operations comprising:
    registering the end user device with the communication network, wherein the registering comprises:
        registering a version of firmware deployed on the end user device; and
        installing a usage monitoring software on the end user device;
    monitoring an application in the end user device that does not interact with the communication network via the usage monitoring software that is installed;
    monitoring the client software application that is deployed in the end user device for accessing the communication network, wherein the monitoring the client software application comprises:
        monitoring data relating to a feature usage performed on the end user device, wherein the monitoring the data comprises monitoring a type and a frequency of a feature used on the end user device; and
    analyzing the data to detect potential software incompatibility between the client software application and the application that does not interact with the communication network running on the end user device with a future network software upgrade to be performed by the communication network.

7. The non-transitory computer-readable medium of claim 6, wherein the communication network is a voice over internet protocol network.

8. The non-transitory computer-readable medium of claim 6, wherein the registering further comprises:
    registering a type of the end user device.

9. The non-transitory computer-readable medium of claim 6, wherein the data is received periodically.

10. The non-transitory computer-readable medium of claim 6, wherein the end user device is an internet protocol based customer premise equipment device.

11. A system for monitoring a client software application in an end user device in a communication network, comprising:
    a processor; and
    a non-transitory computer-readable medium storing a plurality of instructions which, when executed by the processor, cause the processor to perform operations, the operations comprising:
        registering the end user device with the communication network, wherein the registering comprises:
            registering a version of firmware deployed on the end user device; and
            installing a usage monitoring software on the end user device;
        monitoring an application in the end user device that does not interact with the communication network via the usage monitoring software that is installed;
        monitoring the client software application that is deployed in the end user device for accessing the communication network, wherein the monitoring the client software application comprises:
            monitoring data relating to a feature usage performed on the end user device, wherein the monitoring the data monitors a type and a frequency of a feature used on the end user device; and
        analyzing the data to detect potential software incompatibility between the client software application and the application that does not interact with the communication network running on the end user device with a future network software upgrade to be performed by the communication network.

12. The system of claim 11, wherein the communication network is a voice over internet protocol network.

13. The system of claim 11, wherein the registering further comprises:
    registering a type of the end user device.

14. The method of claim 1, wherein the registering further comprises:
   registering a model of the end user device.

15. The method of claim 1, wherein the registering further comprises:
   registering a hardware version of the end user device.

16. The method of claim 1, wherein the registering further comprises:
   registering a version of the client software application.

17. The non-transitory computer-readable medium of claim 6, wherein the registering further comprises:
   registering a model of the end user device.

18. The non-transitory computer-readable medium of claim 6, wherein the registering further comprises:
   registering a hardware version of the end user device.

* * * * *